United States Patent
Zhao et al.

(10) Patent No.: US 9,699,291 B2
(45) Date of Patent: Jul. 4, 2017

(54) PHONEPAD

(71) Applicant: Microsoft Technology Licensing, LLC, Redmond, WA (US)

(72) Inventors: Pengxiang Zhao, Bellevue, WA (US); Frank Zheng, Redmond, WA (US); Robert Zhu, Bellevue, WA (US); Ying Chin, Bellevue, WA (US); Zach Zhang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/467,501

(22) Filed: Aug. 25, 2014

(65) Prior Publication Data

US 2016/0057266 A1 Feb. 25, 2016

(51) Int. Cl.
*H04M 1/725* (2006.01)
*H04W 4/00* (2009.01)
*H04W 76/02* (2009.01)
*H04W 56/00* (2009.01)

(52) U.S. Cl.
CPC ......... *H04M 1/7253* (2013.01); *H04W 4/008* (2013.01); *H04W 56/002* (2013.01); *H04W 76/023* (2013.01); *Y02B 60/50* (2013.01)

(58) Field of Classification Search
CPC . H04M 1/7253; H04W 4/008; H04W 76/023; H04W 56/002
See application file for complete search history.

(56) References Cited

U.S. PATENT DOCUMENTS

| | | | | |
|---|---|---|---|---|
| 2011/0296308 A1* | 12/2011 | Yi | ............... | G06F 21/52 715/733 |
| 2013/0091309 A1* | 4/2013 | Bjontegard | ........... | H04W 4/001 710/16 |
| 2013/0260828 A1* | 10/2013 | Kim | ............... | G06F 1/1632 455/557 |
| 2014/0038514 A1 | 2/2014 | Robbins | | |

OTHER PUBLICATIONS

"Second Written Opinion Issued in PCT Application No. PCT/US2015/046445", Mailed Date: Mar. 9, 2016, 4 Pages.
"International Search Report & Written Opinion for PCT Application No. PCT/US2015/046445", Mailed Date: Oct. 23, 2015, 9 Pages.
"International Preliminary Report on Patentability Issued in PCT Application No. PCT/US2015/046445", Mailed Date : Jun. 9, 2016, 6 Pages.

\* cited by examiner

*Primary Examiner* — Kristy A Haupt
(74) *Attorney, Agent, or Firm* — Jonathan M. Waldman (57) ABSTRACT

Example apparatus and methods concern a first device (e.g., phone) having a first set of input or output capabilities interacting with a second device(s) (e.g., tablet) having a second set of input or output capabilities. The first device may detect the second device and establish a communication link with the second device. The first device may receive inputs presented at the second device and provide outputs to be presented by the second device. In response to an action (e.g., touch, gesture) on the second device, an application running on the first device may receive an input, which may in turn determine an output that is provided to the second device. The first device may use the second device to provide an input/output experience that is superior to what the first device could provide with its own built-in input/output components. The combination saves energy and reduces computing complexity.

20 Claims, 9 Drawing Sheets

PHONEPAD

BACKGROUND

Computers used to be connected systems of components that had different specific purposes. For example, a desktop system might have had a monitor, a keyboard, and a console that housed a processor, disk, and memory. Mainframe computers might have had a set of dumb terminals that were wired to a large processor that in turn was wired to a large memory bank, a disk farm, and a tape farm. Miniaturization changed this paradigm and new types of devices emerged. The new devices were more integrated and tended to have multiple elements for multiple purposes in a single apparatus. For example, laptop computers, then tablet computers, then smart phones with significant computing resources appeared. These new devices all had processors, memory, input devices, and output devices. Unlike separate external components that may have been specialized for special purposes (e.g., monitor, keyboard) the integrated components may have compromised performance to fit in a certain sized apparatus (e.g., phone, tablet).

With multiple types of intelligent devices available, users may have acquired a smart phone, a tablet, a laptop computer, a gaming system, and other computerized devices. All these purchases produce duplicated investment. While having multiple devices provided new opportunities and new flexibility, having multiple devices also produced unanticipated consequences. For example, instead of consuming just enough energy to run a single processor, users may have consumed additional energy to run additional processors. Instead of mastering a single interface to a single device, users may have had to learn to interact with multiple interfaces on multiple devices. Additionally, content may have become distributed between devices and thus may have become more difficult to find and use, or may have gotten out of sync between devices, which in turn may have required sophisticated reconciliation or sharing approaches that consumed time, processing power, and network bandwidth to implement.

As of August 2014 there are nearly two billion smart phones in the world. There are also nearly five hundred million tablet computers in the world. Users increasingly carry their own content on their own mobile devices or access their content through their mobile devices. For example, smart phone users and tablet users may store movies, books, video games, and other content on their mobile devices. It may be possible to synchronize content on one device (e.g., phone) with content on another device (e.g., tablet), but the synchronization consumes time, energy, communication bandwidth, and computing resources. Consider a user who is reading a book on their tablet who reaches a certain point and then stops. The user may then pick up their smart phone and want to start reading the same book. The book may be available on the smart phone but may not be opened to the most recently read position. The user may then need to take some explicit actions to synchronize the content on the two devices. Conventional attempts to connect multiple devices include Internet sharing and linking. The users of mobile devices also increasingly carry or access productivity applications, presentation applications, and other applications on their smart phone, tablet, phablet, or other mobile device. Once again, it may be possible to synchronize data for these applications between devices but the synchronization consumes time, energy, communication bandwidth, and computing resources. Users also increasingly perform tasks that used to be performed on larger devices (e.g., laptop computers, desktop computers) on their handheld mobile devices. For example, users browse the Internet, interact with social media, and play games on their handheld mobile devices.

Smart phones and tablets used to be significantly different sizes and seemed to have distinct divergent roles. For example, the smart phone may have been much smaller than the tablet with limited input/output capabilities but extensive processing power and connectivity while the tablet may have been much larger than the phone with extensive input/output capabilities but limited processing power, connectivity, or battery life. The phone may have been used primarily to make calls, text, or do email while the tablet may have been used to read books or papers, view content, or to play games. Over time, as processing power was put in ever smaller form factors, mobile devices (e.g., smart phones) tended to become more powerful. For example, the processing power available in a 2014 smart phone may rival that of the original mainframe computers and recent desktop and laptop computers. Smart phones seem to be getting larger and tablets seem to be getting smaller. However, smart phones still tend to have inferior input/output capabilities compared to tablets and some laptop computers. For example, smart phones may have smaller screens that limit how much data can be displayed and the size of a virtual keyboard that can be displayed. Some attempts have been made to get smart phones and tablets to work together so that the smart phones may benefit from the increased tablet display sizes for input/output, but these attempts have involved significant processing resources on both the smart phone and the tablet. While these attempts may have achieved some interoperability between smart phones and tablets, content still tends to be difficult to share and easily gets out of sync. The difficulty of connecting the devices may have made it difficult, if even possible at all, to transfer the user experience between devices. Additionally, there is still significant duplication of resources on the devices, which leads to duplicated investment. A user may have a smart phone that costs several hundred dollars, a tablet that costs several hundred dollars, and a laptop computer that costs several hundred dollars or perhaps a thousand dollars, all of which perform many of the same tasks using duplicate components (e.g., processor, memory, display, input devices, communication components) that all consume energy. The duplication increases costs, causes additional energy consumption, and increases complexity in at least content sharing.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example apparatus and methods improve over conventional approaches by using external devices (e.g., tablets) as input/output devices for devices (e.g., phones) with relatively inferior input/output capacities. A first device (e.g., smart phone) may be configured with a powerful processor, high-end data communications equipment, memory, and a sophisticated operating system and applications. A second device (e.g., componentized tablet) may be configured with powerful input/output devices including a high resolution display and a touch and hover sensitive input interface. The second device may, however, be configured with a low power processor or even no processor, and may be configured with minimal memory. Instead of being a general purpose tablet computer, the second device may be componentized to act specifically as an input/output device for smart phones or other mobile devices. The first device may be portable, and as it moves from place to place, it may be able to interact with different second devices.

Example apparatus and methods may establish a relationship between a first device (e.g., smart phone) and one or more second devices (e.g., componentized tablet, componentized monitor). The tablet may be used to receive touch or hover gestures or other inputs and to produce input events, data or control for the smart phone. The monitor may be used to present or display outputs produced by the operating system or applications on the smart phone. In one embodiment, the componentized tablet may be used to receive inputs (e.g., touches, gestures, voice) and may also be used to present outputs (e.g., operating system display, application display, game display). The componentized devices may operate like a keyboard or mouse or monitor from a desktop system, where the keyboard, mouse, or monitor have single functions, providing data or control signals to a processor located in another device.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Not every device has to be everything to everybody. Some devices can be configured to be exceptionally good at one thing even while achieving lower pricing. As devices like phones and tablets become even more ubiquitous, the opportunity to optimize the performance of specialized devices has increased. At the same time, the opportunity to reduce cost, reduce energy consumption, and reduce complexity has increased through specialization. Improved miniaturization, increased processing power, larger memories, improved input/output, and improved device-to-device communication abilities now provide an opportunity to resolve issues associated with having multiple devices. Rather than adding more and more capability to every device, example apparatus and methods concentrate general purpose processing power and content into one device and allow other devices to return to specialized component status. For example, processing power, memory, network connectivity, and telephony may be concentrated into a smart phone. The smart phone may have a small display with average resolution. This high powered device may then interact with less intelligent devices for specific purposes. For example, the smart phone may interact with a minimalist tablet that has minimal, if any, processing power or memory but that is optimized for input/output. The tablet may have just enough computing resources to display content provided by the phone and to generate input events from a touch or hover screen. The majority of the resources on the tablet may be allocated to the input/output (i/o) interface and thus a superior i/o experience may be provided for the system with reduced cost since the processing power, memory, and network connectivity may be provided by the smart phone. This scenario harkens back to when a user had a desktop computer that had a monitor that was connected by wires to the console and a keyboard that was connected by wires to the console. The keyboard was optimized to be a keyboard and could be swapped in or out with different keyboards without changing the console. Similarly, the monitor was optimized to be a monitor and could be swapped in or out with different monitors without changing the monitor. As improved keyboards or monitors were developed they could be deployed with the console without having to change the console. Similarly, as improved consoles were developed, they could be deployed with existing keyboards or monitors without having to change the components. Unlike the desktop or mainframe model, the "console" may be replaced by a smart phone that is portable and that can interact with different sets of components at different locations. The smart phone may function all on its own, without external components, albeit with reduced i/o capability due to screen size.

Example apparatus and methods facilitate this component approach to computing where i/o devices can be optimized for their i/o function even while reducing their costs since the resources (e.g., processor, memory, connectivity) needed to run sophisticated applications and operating systems will run on, for example, the smart phone. With this approach, a user may carry their processor and content from place to place on their phone and interact with different components that provide i/o that is superior to that available on just the phone. Since the content is carried from place to place in the smart phone, or is stored in the cloud but accessible from the single point of contact in the smart phone, issues associated with duplicating content, sharing content, and content getting out of sync are resolved. Since the computing resources in the components are reduced, issues associated with cost and power consumption are mitigated. Since the user is using the same phone, operating, system, application, and interfaces wherever they are, they can more easily have their user experience transferred seamlessly from place to place onto different external components.

Figure 1:
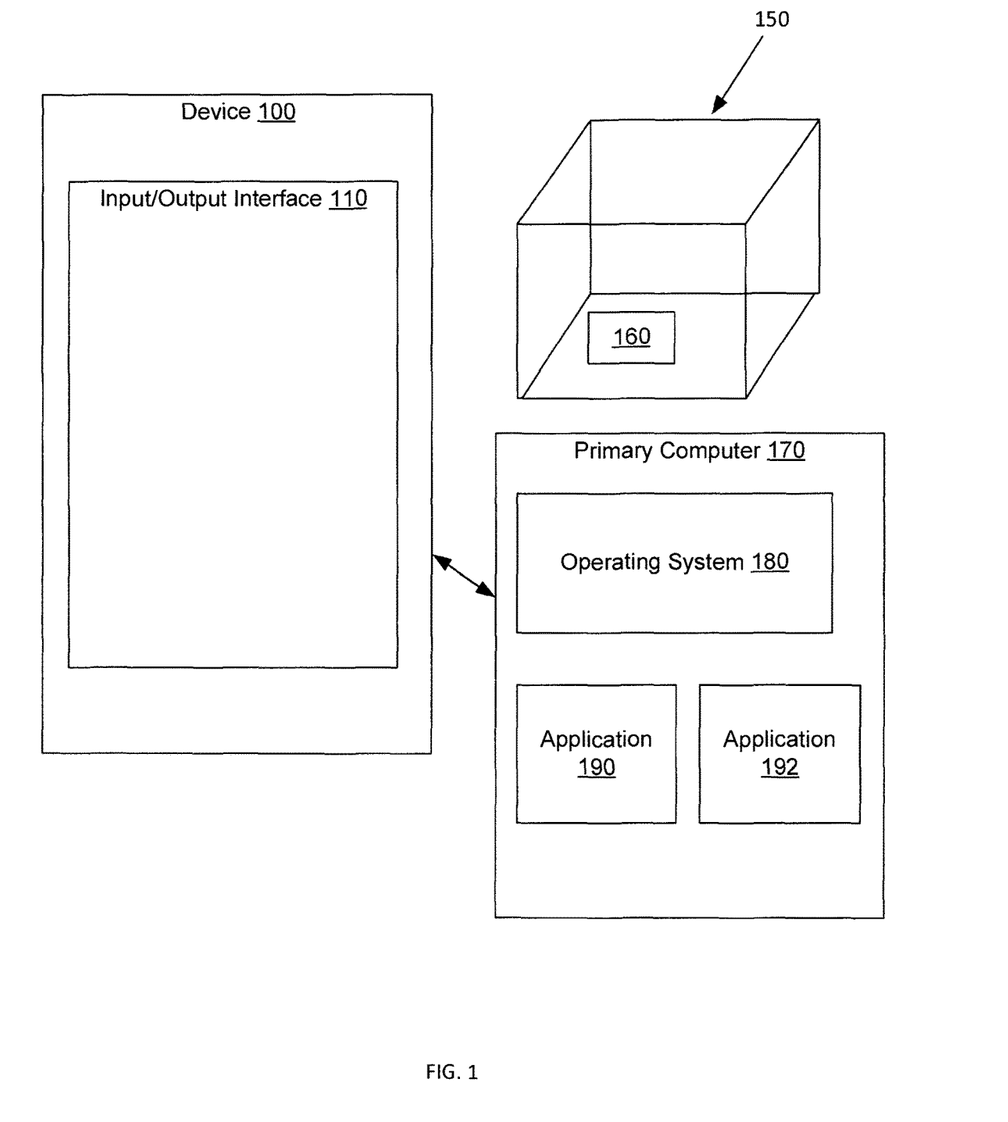
FIG. 1 illustrates an example mobile device interacting with a second device.

FIG. 1 illustrates an example device 100 that provides componentized i/o for another example device 170. Device 100 may be, for example, a componentized tablet. Device 170 may be, for example, a smart phone. Device 100 includes an input/output (i/o) interface 110. In one embodiment, I/O interface 110 may be both touch-sensitive and hover-sensitive. The device 100 may include a touch detector that detects when an object (e.g., digit, pencil stylus with capacitive tip) is touching the i/o interface 110. The touch detector may report on the location (x, y) of an object that touches the i/o interface 110, or other information. The touch detector may also report on a direction in which the object is moving, a velocity at which the object is moving, whether the object performed a tap, double tap, triple tap or other tap action, whether the object performed a recognizable gesture, or other information. Device 100 may have been designed specifically to provide a superior input/output experience for a user. Device 100 may not include general purpose computing resources like a processor and memory for running an operating system and applications. Instead, device 100 may include just enough computing resources to provide the i/o interface and to interact with a primary computer 170. The primary computer 170 may be, for example, a smart phone. The smart phone may have some i/o capability, but due to its form factor there may be limited real estate available for display and for accepting inputs. The limited real estate may particularly limit the ability to type on the smart phone.

The device 100 may include a proximity detector that detects when an object (e.g., digit, pencil, stylus with capacitive tip) is close to but not touching the i/o interface 110. The proximity detector may identify the location (x, y, z) of an object 160 in a three-dimensional hover space 150, where x and y are orthogonal to each other and in a plane parallel to the surface of the interface 110 and z is perpendicular to the surface of interface 110. The proximity detector may also identify other attributes of the object 160 including, for example, the speed with which the object 160 is moving in the hover space 150, the orientation (e.g., pitch, roll, yaw) of the object 160 with respect to the hover space 150, the direction in which the object 160 is moving with respect to the hover space 150 or device 100, a gesture being made by the object 160, or other attributes of the object 160. While a single object 160 is illustrated, the proximity detector may detect more than one object in the hover space 150. Thus, device 100 may provide an i/o experience that is superior to that possible with the primary computer 170. While a tablet and a smart phone are described, more generally, a componentized i/o device may provide superior input or output capability for a general purpose device.

In different examples, the touch detector may use active or passive systems. Similarly, in different examples, the proximity detector may use active or passive systems. In one embodiment, a single apparatus may perform both the touch detector and proximity detector functions. The combined detector may use sensing technologies including, but not limited to, capacitive, electric field, inductive, Hall effect, Reed effect, Eddy current, magneto resistive, optical shadow, optical visual light, optical infrared (IR), optical color recognition, ultrasonic, acoustic emission, radar, heat, sonar, conductive, and resistive technologies. Active systems may include, among other systems, infrared or ultrasonic systems. Passive systems may include, among other systems, capacitive or optical shadow systems. In one embodiment, when the combined detector uses capacitive technology, the detector may include a set of capacitive sensing nodes to detect a capacitance change in the hover space 150 or on the i/o interface 110. The capacitance change may be caused, for example, by a digit(s) (e.g., finger, thumb) or other object(s) (e.g., pen, capacitive stylus) that touch the capacitive sensing nodes or that come within the detection range of the capacitive sensing nodes. While smart phones have begun to introduce touch and hover sensitive displays, a tablet that is custom designed to provide these capabilities may provide superior results as compared to the limited screen space available on a phone. A componentized tablet that is custom designed to provide a virtual keyboard may provide a superior typing experience for a smart phone having limited input area. Similarly, a componentized tablet that is custom designed to display outputs from a phone may provide a superior display experience for a smart phone having limited display area. A componentized projector or monitor that is custom designed to display outputs from a phone may also provide a superior output experience for a smart phone having limited display area.

Primary computer 170 may include general purpose computing resources for running an operating system 180 and applications 190 and 192. Device 100 may not include general purpose computing resources for running an operating system or applications but instead may only include special purpose circuits, drivers, or other elements. While a single operating system and two applications are illustrated, the primary computer 170 may run different types or numbers of operating systems or applications.

Figure 2:
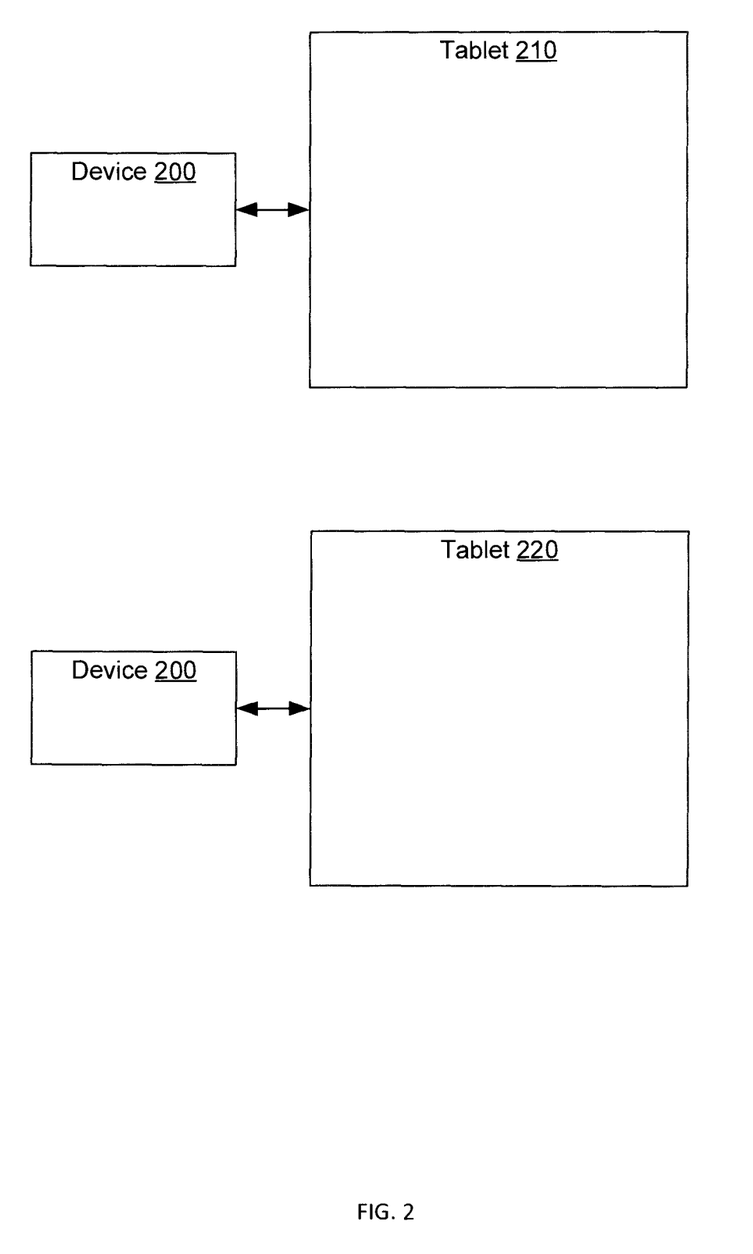
FIG. 2 illustrates an example mobile device interacting with two different second devices at two different times and places.

FIG. 2 illustrates a device 200 interacting with a first tablet 210 at a first location and a second tablet 220 at a second location. Device 200 may be, for example, a smart phone, a laptop, a tablet, or other type of computer. The first location may be, for example, the office while the second location may be, for example, home. Device 200 will have processing power and memory sufficient to run an operating system and applications for a user. Device 200 may have some input/output capability, however first tablet 210 and second tablet 220 may have significantly superior input/output capability. First tablet 210 may be a custom designed tablet that is optimized to provide a superior i/o experience. First tablet 210 may be a "dumb terminal" type of device that does not have processing power or memory for running an operating system or applications. Instead, first tablet 210 may simply generate input events, data, or control signals and provide them to device 200. Similarly, first tablet 210 may simply receive and display output provided by device 200. Since first tablet 210 is just performing i/o operations, first tablet 210 may be less expensive than a comprehensive tablet and may consume less power than a comprehensive tablet.

When device 200 comes within range of first tablet 210, device 200 may establish a relationship with the first tablet 210. The relationship may cause inputs from the first tablet 210 to be provided to device 200 and may cause output generated by device 200 to be displayed by the first tablet 210. The input from the first tablet 210 may be similar to input events generated by a keyboard component that was wired to a conventional desktop computer or may be similar to input events generated by a dumb terminal that was wired to a mainframe. The output provided by the device 200 may be similar to the output generated by a console and provided to a monitor in a conventional desktop computer configuration or provided to a dumb terminal that was wired to a mainframe.

When device 200 leaves the proximity of first tablet 210, device 200 may sever the relationship with first tablet 210. Device 200 may decide to end the relationship even while still in range of first tablet 210 so that, for example, a different device could interact with first tablet 210.

When device 200 comes in range of second tablet 220, device 200 may establish a relationship with the second tablet 220. The relationship may cause inputs from the second tablet 220 to be provided to device 200 and may cause output generated by the device 200 to be displayed by the second tablet 220. In one embodiment, second tablet 220 may be a dumb component similar to first tablet 210. In another embodiment, second tablet 220 may be a comprehensive tablet that actually has computing resources and memory and that may operate as a computer all by itself. When second tablet 220 is a comprehensive tablet, device 200 may control second tablet 220 to operate as a dumb tablet. Thus, device 200 may cause second tablet 220 to provide inputs to device 200 with only enough handling of those events on second tablet 220 to pass them on to device 200. Device 200 may also provide output to be displayed by second tablet 220 with that output being processed only enough to be displayed on second tablet 220. Controlling the second tablet 220 to operate in a dumb terminal mode may allow the second tablet 220 to operate at a lower power state.

Figure 3:
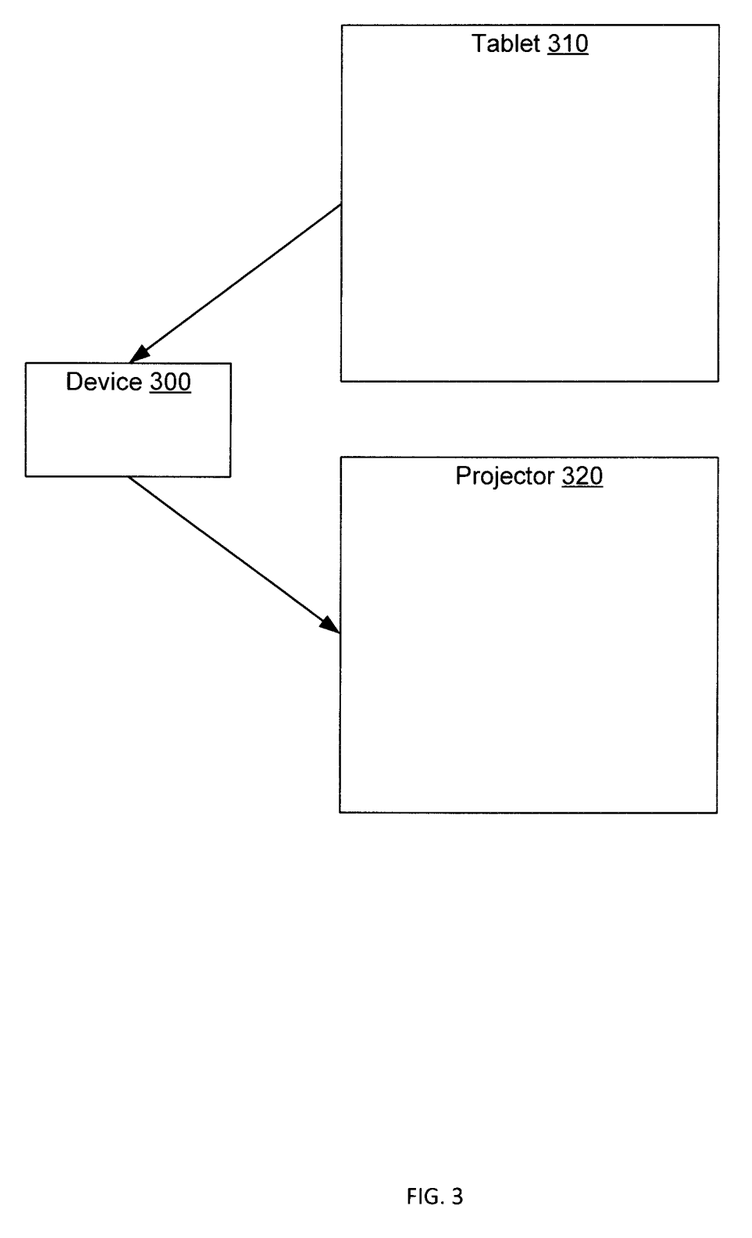
FIG. 3 illustrates an example mobile device interacting with two different second devices at the same time.

FIG. 3 illustrates an example mobile device 300 interacting with two different second devices at the same time. For example, device 300 may interact with a tablet 310 and a projector 320. Tablet 310 may be used to provide inputs to device 300 and projector 320 may be used to display outputs from device 300. For example, a user may have a video game running on device 300. The tablet 310 may be used to provide a touch or hover interface for the game. Thus, touch events or hover events may be detected at tablet 310 and provided to device 300. The touch events or hover events may control the game and thus may control what output is produced by the game. The output may be provided to the projector 320. The overall price of the device 300, the tablet 310, and the projector 320 may be less than having three standalone systems. The power consumed by the device 300, the tablet 310, and the projector 320 may be less than the power consumed by three standalone systems. The complexity of making the device 300, the tablet 310, and the projector 320 work together may be less than trying to get three standalone systems to interact as desired. The amount of network bandwidth used may be limited to bandwidth needed by device 300 since tablet 310 and projector 320 may communicate only with device 300. Tablet 310 and projector 320 may communicate using close range protocols including, for example, WiFi, Bluetooth, or near field communications.

Figure 4:
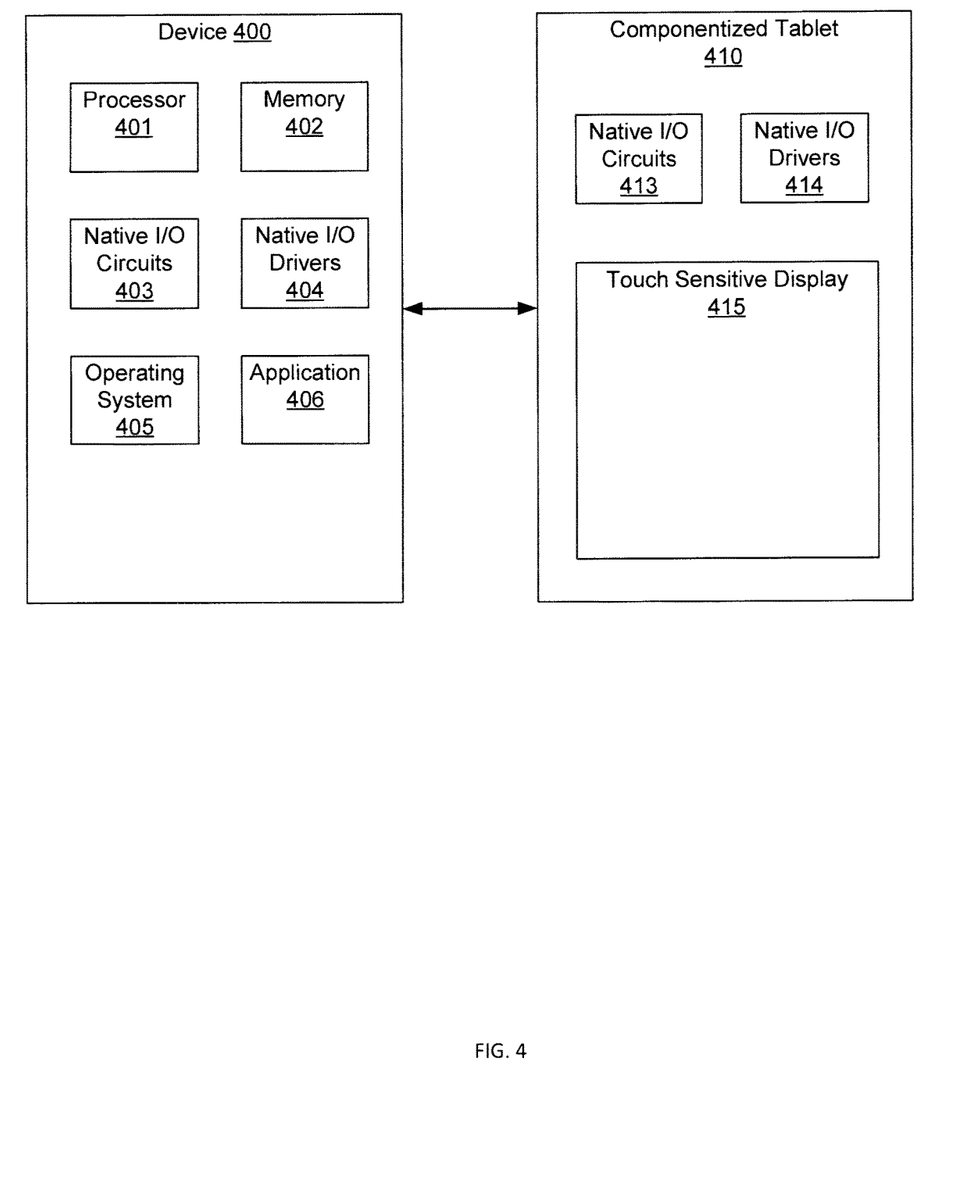
FIG. 4 illustrates an example device configured with a complete set of computer components (e.g., processor, memory, i/o circuits) that runs applications and an operating system and an example componentized tablet that includes circuits and drivers for providing input/output capabilities.

FIG. 4 illustrates an example device 400 configured with a complete set of computer components (e.g., processor 401, memory 402, i/o circuits 403) that run an operating system 405 and application 406. Device 400 may include drivers 404 for interfacing between the i/o circuits 403 and processor 401. FIG. 4 also illustrates an example componentized tablet 410. A "componentized device" is a device that does not function as a general purpose computer but instead functions as a special purpose device (e.g., touch input device, hover input device, display). Componentized tablet 410 may only include circuits 413 and drivers 414 for providing input/output capabilities. For example, circuits 413 may detect touches on touch sensitive display 415 and drivers 414 may provide data or control signals concerning those touches to device 400. Additionally, drivers 414 may receive output data or commands from device 400 and render, display, or otherwise present output on touch sensitive display 415. While a touch sensitive display is described, other types of input or output apparatus may be employed. While device 400 is illustrated interacting with a single tablet 410, example apparatus may interact with multiple componentized tablets. For example, device 400 may use tablet 410 to provide enhanced i/o for application 406. Additionally, at the same time, device 400 may use an additional separate tablet to provide enhanced i/o for a second application. Consider a game scenario where four players in a room are playing a multi-player game. The phone of one user may run the game and the gamers may interact with the game through their own separate tablets. In one embodiment, the phone may cause different gamers to have different interfaces and different presentations.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 5:
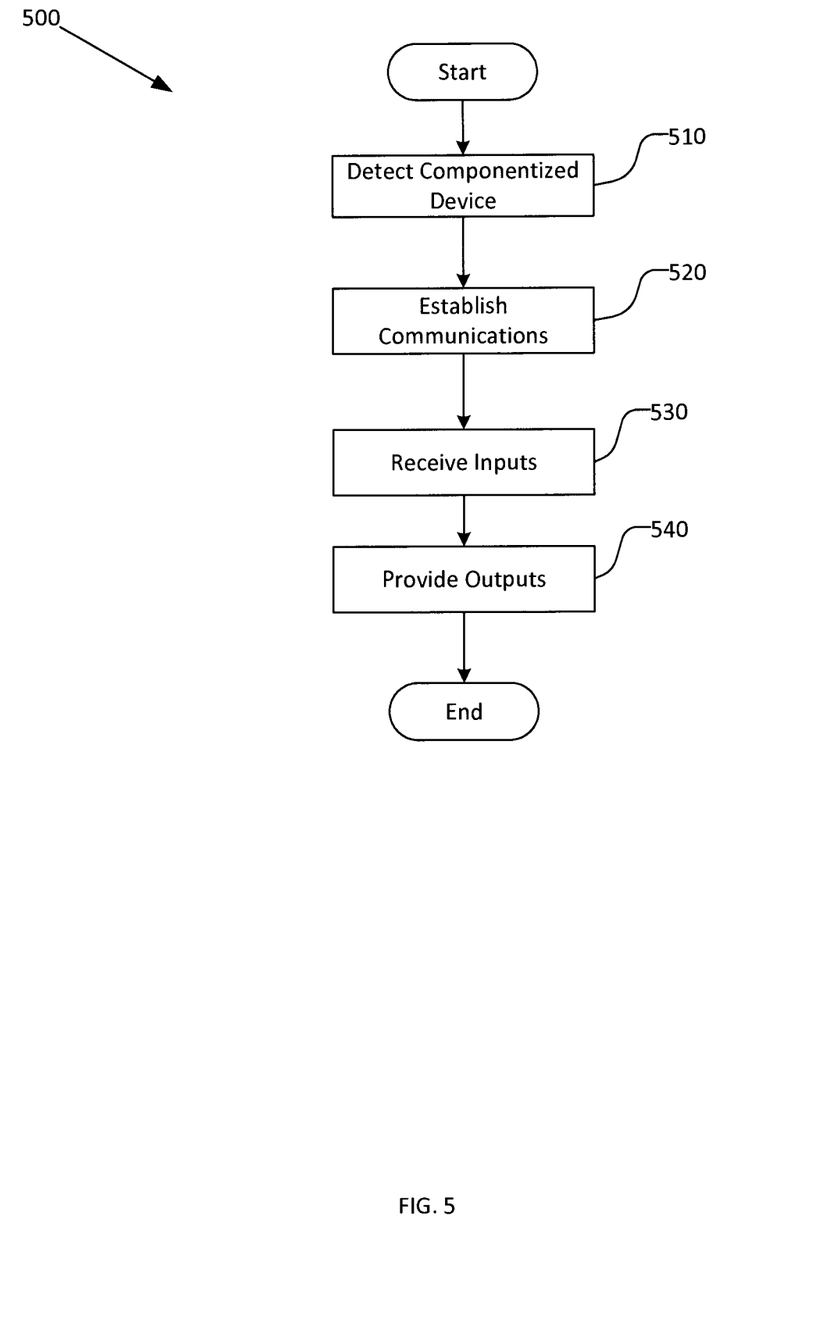
FIG. 5 illustrates an example method associated with a mobile device using a componentized device for enhanced input/output.

FIG. 5 illustrates an example method 500 associated with a mobile device using a componentized device for enhanced input or output. The mobile device may be, for example, a smart phone that has a first level of input or output capability. The mobile device may be a general purpose computing device that includes resources (e.g., processor, memory, i/o capability) for running an operating system and application. Method 500 may be performed by a general purpose mobile computing device having a first level of input or output capability.

Method 500 includes, at, 510, detecting a componentized device having a second level of input or output capability that is greater than the first level of input or output capability. The componentized device may be, for example, a tablet computer, a monitor, a computer, a projector, or other device. In one embodiment, the componentized device may provide a second greater level of input or output capability. For example, the componentized device may be a tablet that has a larger touch sensitive i/o screen that can display data in a larger space and that can accept inputs from a larger space. In one embodiment, the general purpose mobile computing device is a cellular telephone and the componentized device is a tablet computer. The componentized device may have a second greater level of input and output capability.

Method 500 includes, at 520, establishing a communication link between the first device and the componentized device. Establishing the communication link may include, for example, establishing a wired link or a wireless link. The wired link may be established using, for example, an HDMI (high definition multimedia interface) interface, a USB (universal serial bus) interface, or other interface. The wireless link may be established using, for example, a Miracast interface, a Bluetooth interface, an NFC (near field communication) interface, or other interface. A Miracast interface facilitates establishing a peer-to-peer wireless screencasting connection using WiFi direct connections. A Bluetooth interface facilitates exchanging data over short distances using short-wavelength microwave transmission in the ISM (Industrial, Scientific, Medical) band.

Method 500 also includes, at 530, receiving inputs from the componentized device. In one embodiment, method 500 may include controlling the componentized device to provide inputs to the general purpose mobile computing device only. The inputs may be associated with, for example, a touch event or a hover event. The inputs may be data, control signals, voltages, objects, events, or other inputs.

Method 500 also includes, at 540, providing output from the first device to the componentized device. In one embodiment, method 500 may include controlling the componentized device to accept outputs from the general purpose mobile computing device only. The outputs may be, for example, display outputs, tactile outputs, audio outputs, thermal outputs, or olfactory outputs. The outputs may be data, control signals, voltages, objects, events, or other outputs.

While method 500 may be run by a single smart phone that interacts with a single tablet computer, method 500 may also facilitate a multi-device experience. For example, method 500 may include establishing a communication link with two or more componentized devices having second levels of input or output capability that are different than the first level of input or output capability. For example, the smart phone may establish a link with two different tablets. Once the link is established, inputs may be received from the two or more componentized devices, and outputs may be provided to the two or more componentized devices. This may facilitate providing a multi-user experience for a video game, collaborative productivity application, or other multi-user scenario. Consider a video football game. The game may run on the smart phone and two different players may play using their own tablet computers. Different inputs may be received from both tablet computers and different outputs may be provided to the two tablet computers.

Thus, method 500 may include providing the inputs from the two or more componentized devices to a multi-user application running on the general purpose mobile computing device and providing different outputs from the multi-user application running on the general purpose mobile computing device to different members of the two or more componentized devices. For example, one player using one tablet may provide inputs associated with controlling a football team on offense while another player may provide inputs associated with controlling a football team on defense. The two users may see different menus or choices for their different perspectives on the video game.

Figure 6:
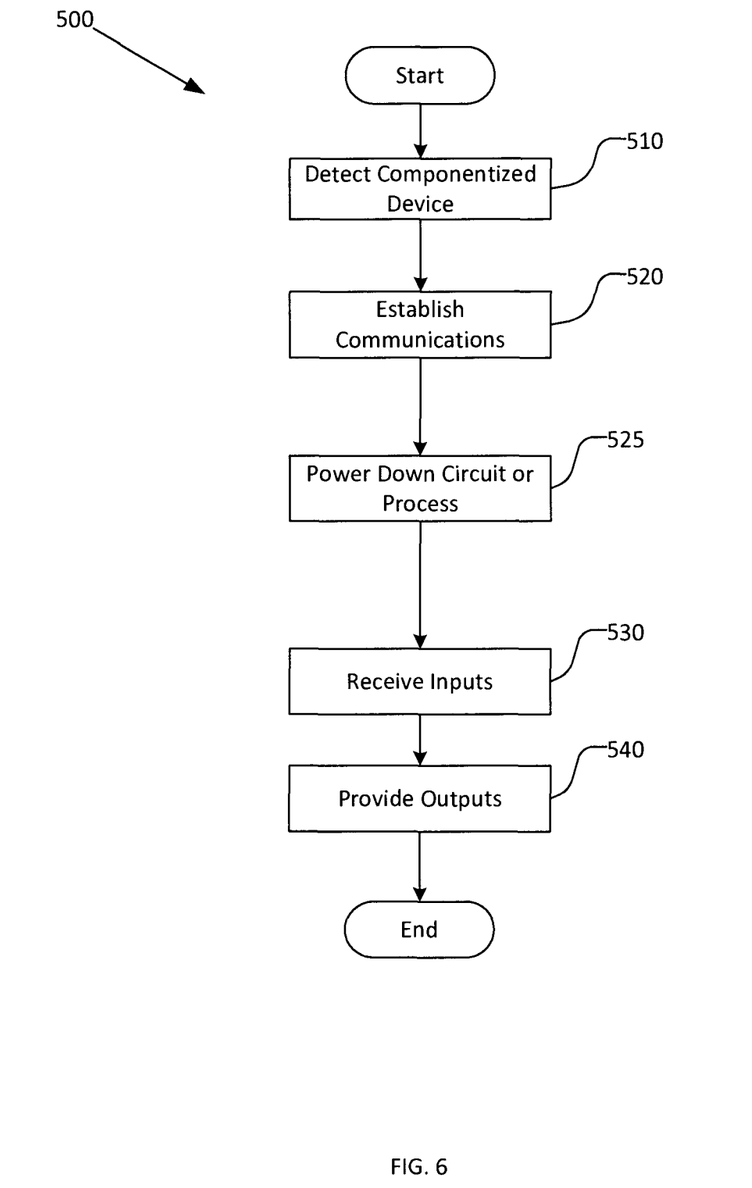
FIG. 6 illustrates an example method associated with a mobile device using a componentized device for enhanced input/output.

FIG. 6 illustrates another embodiment of method 500. This embodiment includes an additional action. This embodiment includes, at 525, controlling the second device to act in a componentized mode. Controlling the second device to act in a componentized mode may allow the second device (e.g., tablet) to turn off elements (e.g., network, processor, memory). In one embodiment, controlling the second device to act in a componentized mode may include controlling the componentized device to selectively power down a circuit or process not associated with providing the input or output capability. In this embodiment, method 500 may improve over conventional systems by reducing power consumption. Since fewer components may be running on the second device, i/o processing time may be reduced on the second device.

While FIGS. 5 and 6 illustrate various actions occurring in serial, it is to be appreciated that various actions illustrated in FIGS. 5 and 6 could occur substantially in parallel. By way of illustration, a first process could control detecting secondary devices, a second process could control handling input from secondary devices, and a third process could control providing output to secondary devices. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer, phone, tablet) cause the machine to perform methods described or claimed herein including methods 500 or 600. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 7:
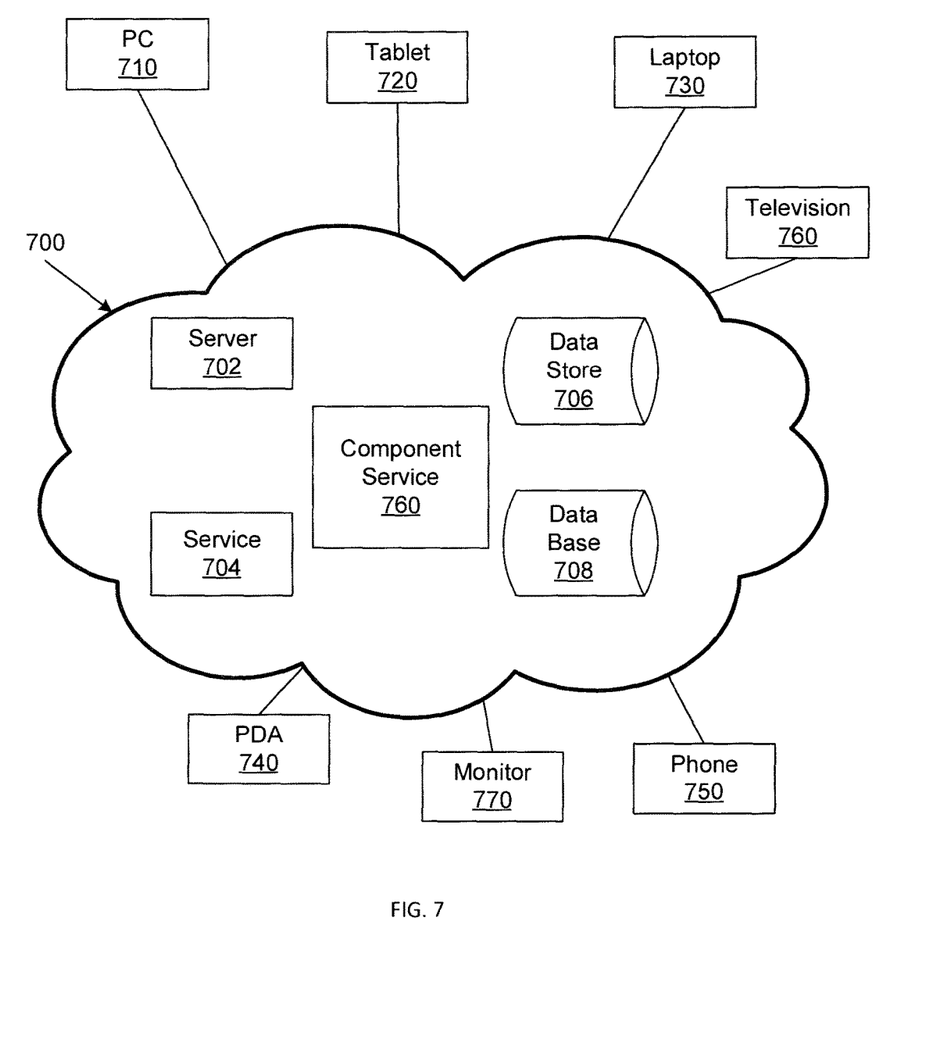
FIG. 7 illustrates an example cloud operating environment in which a mobile device may use a componentized device for enhanced input/output.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example component service 760 residing in the cloud 700. The component service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud 700 and may, therefore, be used by the component service 760.

FIG. 7 illustrates various devices accessing the component service 760 in the cloud 700. The devices include a computer 710, a tablet 720, a laptop computer 730, a desktop monitor 770, a television 760, a personal digital assistant 740, and a mobile device (e.g., cellular phone, satellite phone) 750. It is possible that different users at different locations using different devices may access the component service 760 through different networks or interfaces. In one example, the component service 760 may be accessed by a mobile device 750. In another example, portions of component service 760 may reside on a mobile device 750. Component service 760 may perform actions including, for example, presenting content on a secondary display, presenting an application (e.g., browser) on a secondary display, receiving input events generated by a secondary display or device, or other service. In one embodiment, component service 760 may perform portions of methods described herein (e.g., method 500, method 600).

Component service 760 may, for example, accept inputs from a first device (e.g., tablet 720), provide the inputs to a second device (e.g., laptop computer 730) for processing, receive outputs from the second device, where the outputs were generated based, at least in part, on the inputs, and cause the outputs to be displayed by a third device (e.g., television 760). Different combinations of devices may generate inputs, process data, and provide outputs. Component service 760 facilitates centralizing processing power and content in a single device and using components with superior i/o capabilities but lower costs and power consumption than separate computers to receive inputs and display outputs.

Figure 8:
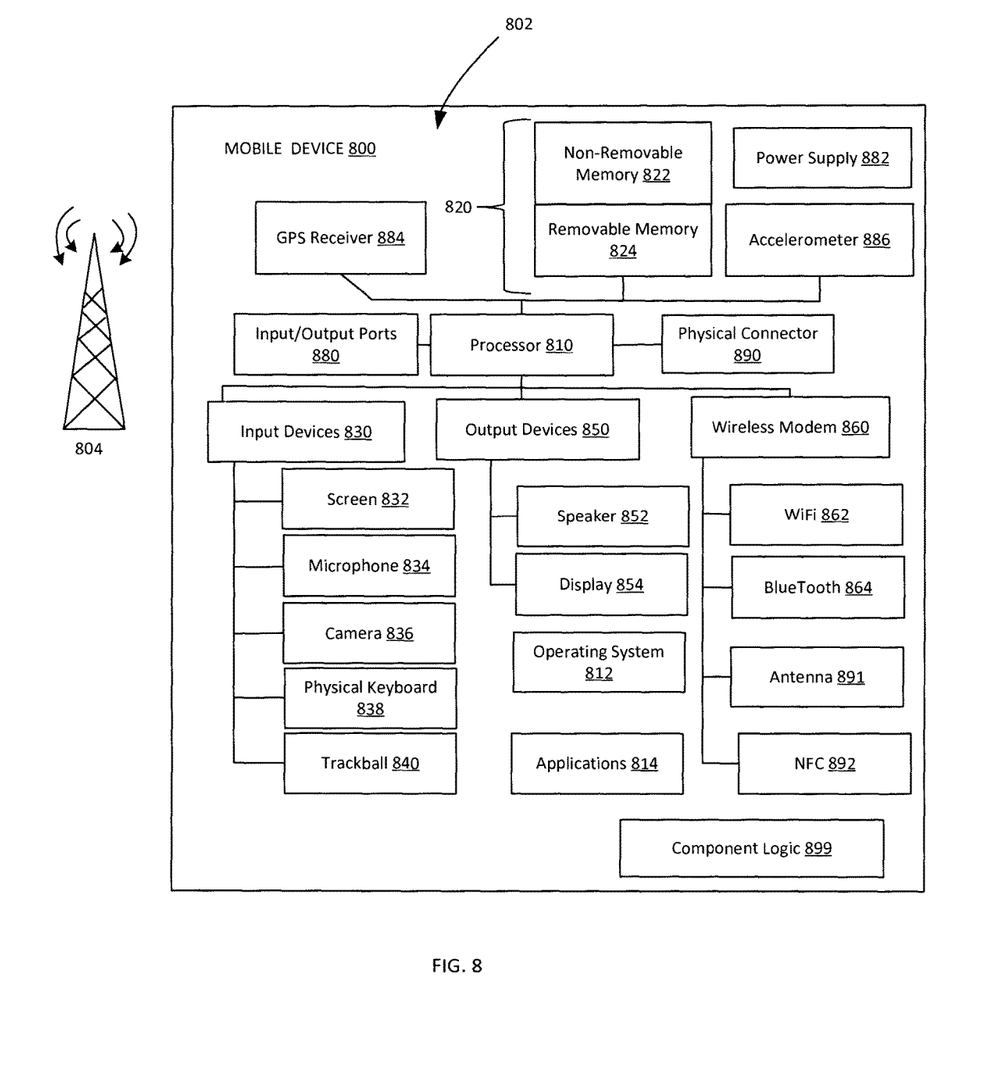
FIG. 8 is a system diagram depicting an exemplary mobile communication device that may use a componentized device for enhanced input/output.

FIG. 8 is a system diagram depicting an exemplary mobile device 800 that includes a variety of optional hardware and software components shown generally at 802. Components 802 in the mobile device 800 can communicate with other components, although not all connections are shown for ease of illustration. The mobile device 800 may be a variety of computing devices (e.g., cell phone, smartphone, tablet, phablet, handheld computer, Personal Digital Assistant (PDA), etc.) and may allow wireless two-way communications with one or more mobile communications networks 804, such as a cellular or satellite networks. Example apparatus may concentrate processing power, memory, and connectivity resources in mobile device 800 with the expectation that mobile device 800 may be able to interact with other devices (e.g., tablet, monitor, keyboard) having superior input capabilities.

Mobile device 800 can include a controller or processor 810 (e.g., signal processor, microprocessor, application specific integrated circuit (ASIC), or other control and processing logic circuitry) for performing tasks including input event handling, output event generation, signal coding, data processing, input/output processing, power control, or other functions. An operating system 812 can control the allocation and usage of the components 802 and support application programs 814. The application programs 814 can include mobile computing applications (e.g., email applications, calendars, contact managers, web browsers, messaging applications), video games, movie players, television players, productivity applications, or other applications. Inputs to the application programs 814 may be provided by an external component. Application programs 814 may produce outputs that are displayed on an external component. Mobile device 800 may identify the external component that has the greatest input capability and control that external component to provide inputs to mobile device 800. Similarly, mobile device 800 may identify the external component that has the greatest output capability and control that external component to render, display, or otherwise provide outputs.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include touch action data, hover action data, combination touch and hover action data, user interface element state, cursor data, hover control data, hover action data, control event data, web pages, text, images, sound files, video data, or other data sets to be sent to or received from one or more network servers or other devices via one or more wired or wireless networks. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment. The memory 820 may be sufficient to allow an external component (e.g., special purpose tablet) to have minimal memory similar to how a keyboard for a desktop system has minimal memory.

The mobile device 800 can support one or more input devices 830 including, but not limited to, a screen 832 that is both touch and hover-sensitive, a microphone 834, a camera 836, a physical keyboard 838, or trackball 840. The mobile device 800 may also support output devices 850 including, but not limited to, a speaker 852 and a display 854. Display 854 may be incorporated into a touch-sensitive and hover-sensitive i/o interface. Other possible input devices (not shown) include accelerometers (e.g., one dimensional, two dimensional, three dimensional). Other possible output devices (not shown) can include piezoelectric or other haptic output devices. Some devices can serve more than one input/output function. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 can include speech-recognition software as part of a voice user interface that allows a user to operate the device 800 via voice commands. Further, the device 800 can include input devices and software that allow for user interaction via a user's spatial gestures, such as detecting and interpreting touch and hover gestures associated with controlling output actions on a secondary display.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices that have input devices from which inputs can be received or output devices to which outputs can be provided as controlled, at least in part, by controller logic 899. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The illustrated components 802 are not required or all-inclusive, as other components can be deleted or added.

Mobile device 800 may include a component logic 899 that provides a functionality for the mobile device 800 and for interacting with external components (e.g., dumb tablet, keyboard, monitor). For example, component logic 899 may provide a client for interacting with a service (e.g., service 760, FIG. 7). Portions of the example methods described herein may be performed by component logic 899. Similarly, component logic 899 may implement portions of apparatus described herein. In one embodiment, component logic 899 may identify an input device that is best suited for a particular application running on device 800. For example, for an application that requires extensive typing input, component logic 899 may identify the external component that provides a superior typing experience. Inputs may then be directed from the component to device 800. Similarly, component logic 899 may identify an output device that is best suited for a particular application running on device 800. For example, for an application (e.g., video game) that has fast-moving high-resolution graphics, component logic 899 may identify the external component that provides a superior viewing experience. Outputs may then be directed from the device 800 to the component.

Figure 9:
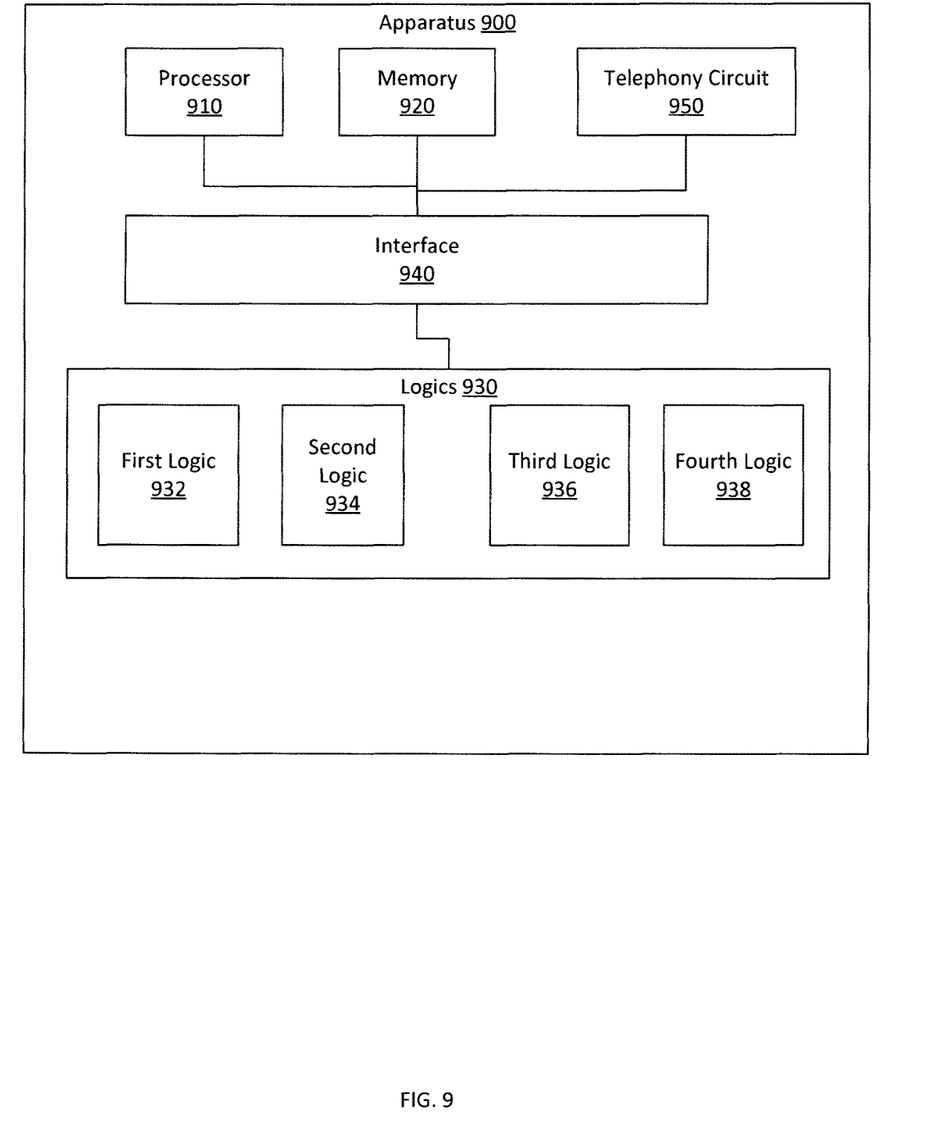
FIG. 9 illustrates an example apparatus that may use a componentized device for enhanced input/output.

FIG. 9 illustrates an apparatus 900 that may use a componentized device for enhanced input/output. In one example, the apparatus 900 includes a physical interface 940 that connects a processor 910, a memory 920, a cellular telephony circuit 950, and a set of logics 930. The set of logics may facilitate using an input capability or output capability provided by a separate apparatus. For example, the set of logics 930 may facilitate identifying componentized devices that have input or output capabilities superior to those native to apparatus 900. The set of logics 930 may also facilitate establishing communications with the componentized devices or transferring data or control between apparatus 900 and the componentized devices. The set of logics may receive inputs from a componentized device and provide outputs to a componentized device. Elements of the apparatus 900 may be configured to communicate with each other, but not all connections have been shown for clarity of illustration.

Apparatus 900 may include a first logic 932 that detects a second apparatus that has an input capability superior to the apparatus 900 or that has an output capability superior to the apparatus 900. The input capability may be superior when, for example, the second apparatus has a larger input surface or a surface that provides a functionality (e.g., hover sensitivity, voice control, haptic control) not available on the apparatus 900. The output capability may be superior when, for example, the second apparatus has a larger output surface or a display that has a higher resolution than the apparatus 900. Consider a cell phone with a touch sensitive i/o surface that is two inches by four inches and that has a resolution of X dots per inch (dpi), X being a number. A tablet computer may have a touch and hover sensitive i/o surface that is six inches by eight inches and that has a resolution of 2× dpi. Thus, a user experience may be improved by doing i/o on the tablet for an application running on the phone. In one embodiment, the first logic 932 selects one second apparatus for input and selects a different second apparatus for output. For example, a standalone keyboard may be selected for input and a tablet may be selected for output.

Apparatus 900 may include a second logic 934 that controls the second apparatus to provide input data or control to the apparatus 900. Second logic 934 may also receive the input data or control from the second apparatus. The input data or control may concern a touch input, a hover input, an audible input, a voice input, a haptic input, or other input.

Apparatus 900 may include a third logic 936 that provides outputs to the second apparatus and controls the second apparatus to present the outputs. In one embodiment, the outputs are based, at least in part, on the input data or control. In one embodiment, the second apparatus may be a componentized device that is only capable of providing the input data or control or presenting the outputs. The outputs may be associated with, for example, display outputs, tactile outputs, audio outputs, thermal outputs, olfactory outputs, or other outputs.

In one embodiment, apparatus 900 may include a fourth logic 938 that selects the second apparatus from two or more available apparatus. The second apparatus may be selected based, at least in part, on an input capability associated with an application running on the apparatus 900 or on an output capability associated with an application running on the apparatus 900. For example, a productivity application running on apparatus 900 may cause the fourth logic 938 to select a second apparatus that provides a superior typing experience while a video game application running on apparatus 900 may cause fourth logic 938 to select a second apparatus that provides superior high speed graphics display.

Apparatus 900 may provide superior results when compared to conventional systems because the first logic 832 may control the second apparatus to reduce power to a circuit or process not needed to provide the input capability or the output capability.

Apparatus 900 may facilitate providing a multi-user experience from a single phone. For example, the first logic 932 may detect two or more second apparatus that may participate in a multi-user experience provided by the apparatus 900. The multi-user experience may be, for example, a video game, a collaborative productivity session, or other multi-user experience. In one embodiment, the second logic 934 controls members of the two or more second apparatus to provide user-specific inputs associated with the multi-user experience. The third logic 936 may also provide user-specific outputs to different members of the two or more second apparatus. For example, a first user at a first tablet may edit the graphics for a slide while a second user at a second tablet may edit the text for the slide. Each user may use their own tablet to perform their edits. The slide program may run on one phone.

Apparatus 900 may include a memory 920. Memory 920 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 920 may be configured to store user interface state information, characterization data, object data, or other data.

Apparatus 900 may include a processor 910. Processor 910 may be, for example, a signal processor, a microprocessor, an application specific integrated circuit (ASIC), or other control and processing logic circuitry for performing tasks including signal coding, data processing, input/output processing, power control, or other functions.

In one embodiment, the apparatus 900 may be a general purpose computer that has been transformed into a special purpose computer through the inclusion of the set of logics 930. Apparatus 900 may interact with other apparatus, processes, and services through, for example, a computer network.

In one embodiment, the functionality associated with the set of logics 930 may be performed, at least in part, by hardware logic components including, but not limited to, field-programmable gate arrays (FPGAs), application specific integrated circuits (ASICs), application specific standard products (ASSPs), system on a chip systems (SOCs), or complex programmable logic devices (CPLDs).

Aspects of Certain Embodiments

In one embodiment, an apparatus includes a processor, a memory, a cellular telephony circuit, and a set of logics. The apparatus may include a physical interface to connect the processor, the memory, the cellular telephony circuit, and the set of logics. The set of logics includes a first logic that detects a second apparatus that has an input capability superior to the apparatus or that has an output capability superior to the apparatus. The set of logics also includes a second logic that controls the second apparatus to provide input data or control to the apparatus 900 and that receives the input data or control from the second apparatus. The set of logics also includes a third logic that provides outputs to the second apparatus and controls the second apparatus to present the outputs. The apparatus may also include a fourth logic that selects the second apparatus from two or more available apparatus. The second apparatus may be selected based, at least in part, on an input capability associated with an application running on the apparatus or on an output capability associated with an application running on the apparatus.

In another embodiment, a system includes a mobile device and one or more componentized external devices. The mobile device may be a smart phone running an operating system and an application and the componentized external device may be a componentized tablet that is not running an operating system and an application. The smart phone may control the tablet to provide inputs to the smart phone and may control the tablet to produce outputs determined by the smart phone.

In another embodiment, a method is performed on a general purpose computing device having a first level of i/o capability. The method may include detecting a componentized device having a second level of input or output capability that is greater than the first level of input or output capability and establishing a communication link with the componentized device. Once the communication link is established, the method may include receiving inputs from the componentized device and providing outputs to the componentized device.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a general purpose mobile computing device having a first level of input or output capability, the method comprising:
    detecting a componentized device in range of the general purpose mobile computing device, wherein the componentized device has a second level of input or output capability that is greater than the first level of input or output capability;
    establishing a relationship with the componentized device, wherein the relationship comprises a wireless communication link with the componentized device;
    receiving inputs from the componentized device;
    providing outputs to the componentized device;
    determining that a second componentized device is in range of the general purpose mobile computing device, wherein the second componentized device has a third level of input or output capability that is greater than the first level of input or output capability;
    severing the relationship with the componentized device in response to determining that the second componentized device is in range of the general purpose mobile computing device; and
    establishing a wireless communication link with the second componentized device to receive inputs from the second componentized device and provide outputs to the second componentized device.

2. The method of claim 1, where the general purpose mobile computing device is a cellular telephone and the componentized device is a tablet device.

3. The method of claim 1, where the componentized device has a second greater level of input and output capability.

4. The method of claim 1, comprising controlling the componentized device to provide inputs to the general purpose mobile computing device only and controlling the componentized device to accept outputs from the general purpose mobile computing device only.

5. The method of claim 1, where the inputs are associated with a touch event or a hover event.

6. The method of claim 1, where the outputs are display outputs, tactile outputs, audio outputs, thermal outputs, or olfactory outputs.

7. The method of claim 1, comprising:
    establishing a communication link with two or more componentized devices having second levels of input or output capability that are different than the first level of input or output capability;
    receiving inputs from the two or more componentized devices, and
    providing outputs to the two or more componentized devices.

8. The method of claim 7, comprising:
    providing the inputs from the two or more componentized devices to a multi-user application running on the general purpose mobile computing device, and
    providing different outputs from the multi-user application running on the general purpose mobile computing device to different members of the two or more componentized devices.

9. The method of claim 1, comprising controlling the componentized device to selectively power down a circuit or process not associated with providing the input or output capability.

10. An apparatus, comprising:
    a processor;
    a memory;
    a cellular telephony circuit;
    a set of logics that facilitate using an input capability or output capability provided by a separate apparatus, and
    a physical interface to connect the processor, the memory, the cellular telephony circuit, and the set of logics,
    the set of logics comprising:
        a first logic that detects a second apparatus in range of the apparatus, wherein the second apparatus has an input capability superior to the apparatus or that has an output capability superior to the apparatus;
        a second logic that controls the second apparatus to provide input data or control to the apparatus and that receives the input data or control from the second apparatus, via a wireless communication link;
        a third logic that provides outputs to the second apparatus and controls the second apparatus to present the outputs; and
        further logic that determines that a third apparatus is in range of the apparatus, wherein the third apparatus has an input capability superior to the apparatus or has an output capability superior to the apparatus, severs the wireless communication link with the second apparatus in response to determining that the third apparatus is in range of the apparatus, and establishes a wireless communication link with the third apparatus to receive inputs from the third apparatus and provide outputs to the third apparatus.

11. The apparatus of claim 10, where the outputs are based, at least in part, on the input data or control.

12. The apparatus of claim 10, comprising a fourth logic that selects the second apparatus from two or more available apparatus based, at least in part, on an input capability associated with an application running on the apparatus or on an output capability associated with an application running on the apparatus.

13. The apparatus of claim 10, where the first logic selects a first second apparatus for input and selects a second second apparatus for output.

14. The apparatus of claim 10, where the second apparatus is a componentized device that is only capable of providing the input data or control or presenting the outputs.

15. The apparatus of claim 10, where the outputs are a display output, a tactile output, an audio output, a thermal output, or an olfactory output.

16. The apparatus of claim 10, where the input data or control concern a touch input, a hover input, an audible input, a voice input, or a haptic input.

17. The apparatus of claim 10, where the first logic controls the second apparatus to reduce power to a circuit or process not needed to provide the input capability or the output capability.

18. The apparatus of claim 10, where the first logic detects two or more second apparatus that may participate in a multi-user experience provided by the apparatus.

19. The apparatus of claim 18, where the second logic controls members of the two or more second apparatus to provide user-specific inputs associated with the multi-user experience and where the third logic provides user-specific outputs to different members of the two or more second apparatus.

20. A system, comprising:
- a smart phone running an operating system and an application; and
- a componentized tablet that is not running an operating system and an application, wherein the tablet is in range of the smart phone and is in an established relationship with the smart phone, wherein the relationship comprises a wireless communication link with the smart phone,
- where the smart phone controls the tablet to provide inputs to the smart phone,
- where the smart phone controls the tablet to produce outputs determined by the smart phone,
- where the smart phone determines that a componentized device is in range of the smart phone, wherein the componentized device has a level of input or output capability that is greater than the level of input or output capability of the smart phone,
- where the smart phone severs the relationship with the tablet in response to determining that the componentized device is in range of the smart phone, and
- where the smart phone establishes a wireless communication link with the componentized device to receive inputs from the componentized device and provide outputs to the componentized device.

* * * * *